(12) United States Patent
Burg et al.

(10) Patent No.: US 7,600,012 B2
(45) Date of Patent: Oct. 6, 2009

(54) CONFIGURATION MANAGEMENT METHOD FOR P2P CE NETWORKS

(75) Inventors: Bernard Burg, Menlo Park, CA (US); Philippe Morin, Goleta, CA (US)

(73) Assignee: Panasonic Corporation, Osaka (JP)

( * ) Notice: Subject to any disclaimer, the term of this patent is extended or adjusted under 35 U.S.C. 154(b) by 646 days.

(21) Appl. No.: 11/348,880

(22) Filed: Feb. 7, 2006

(65) Prior Publication Data
US 2007/0185596 A1    Aug. 9, 2007

(51) Int. Cl.
  *G06F 15/173* (2006.01)
  *G06F 15/177* (2006.01)
  *G06F 9/45* (2006.01)
(52) U.S. Cl. .................. 709/223; 709/220; 717/146
(58) Field of Classification Search ............ 709/220, 709/223, 224; 717/146, 162
See application file for complete search history.

(56) References Cited

U.S. PATENT DOCUMENTS

2006/0067249 A1 * 3/2006 Poustchi et al. ............. 370/260
2006/0106938 A1 * 5/2006 Dini et al. ................... 709/228
2007/0133040 A1 * 6/2007 Tredoux et al. ............. 358/1.15

OTHER PUBLICATIONS

Whitfort, Tim, "Lecture 4—An Introduction to Pseudo Code", Feb. 2, 2006, "http://ironbark.bendigo.latrobe.edu.au/subjects/PE/2006s1/lectures/lecture04.html".*

* cited by examiner

*Primary Examiner*—Larry D Donaghue
*Assistant Examiner*—Brian J Gillis
(74) *Attorney, Agent, or Firm*—Harness, Dickey & Pierce, PLC

(57) ABSTRACT

A configuration management system for use with a P2P CE network includes a configuration management language (CML) describing devices and functions of a NetCE Environment. A P2P configuration monitor uses a P2P presence service to monitor current presence of devices in the CE Network. A configuration management mechanism takes as input a model of a target function or functions and, using the CML, finds a mapping between the function or functions and present devices in the CE Network, as reported by the configuration monitor.

23 Claims, 11 Drawing Sheets

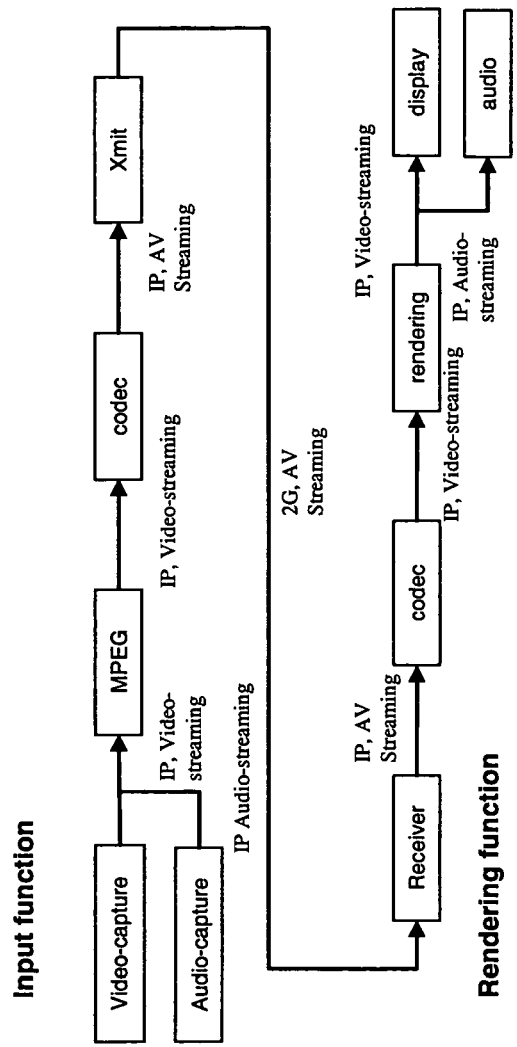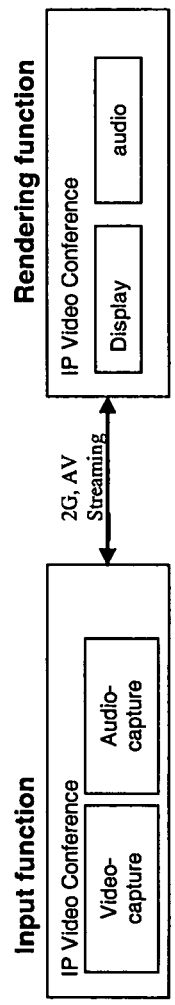
Figure - 9
Figure - 10

CONFIGURATION MANAGEMENT METHOD FOR P2P CE NETWORKS

FIELD OF THE INVENTION

The present invention generally relates to P2P CE networks, and relates in particular to a configuration management method for P2P CE networks.

BACKGROUND OF THE INVENTION

Most existing audio-visual (AV) devices are configured in a static manner. The configuration operation is often performed at the installation of the device. This operation is typically tedious and generally requires reading long and complex manuals. Studies show that only 3% of users read these manuals; hence there are many calls to customer service regarding configuration of devices, and many unhappy customers.

The next generation of AV devices introduces networked devices. These devices include static AV products, as well as mobile ones. Cellular phones, MPEG readers, and cameras are examples of such devices. This new generation of AV devices needs to have automatic configuration and reconfiguration capabilities, so as to always get the best user-experience out of the networked AV devices. This configuration management problem has not only grown in importance, but also in complexity, as specialized hardware connections are replaced by configurable networking capabilities.

One option to solve this problem is to build a star-shaped network where the center of the star centralizes all the connections and provides the configuration management in a centralized manner. This present invention does not focus on this solution.

Instead, the present invention places the focus on a decentralized P2P configuration management solution, where each of the AV devices acts as an independent peer and participates to accomplish a distributed configuration management over the peers. This approach is potentially more resilient and better suited to increasingly capable and autonomous devices.

SUMMARY OF THE INVENTION

In accordance with the present invention, a configuration management system for use with a P2P CE network includes a configuration management language (CML) describing devices and functions of a NetCE Environment. A P2P configuration monitor uses a P2P presence service to monitor current presence of devices in the CE Network. A configuration management mechanism takes as input a model of a target function or functions and, using the CML, finds a mapping between the function or functions and present devices in the CE Network, as reported by the configuration monitor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a block diagram illustrating composition of atomic language elements to describe target functions, such as a complete model of an IP video-conference target function configuration, in accordance with the present invention;

FIG. 10 is a block diagram illustrating a function simplified model emphasizing external connections and primary sub-functions of each function in a configuration, such as a simplified model of an IP video conference function configuration, in accordance with the present invention;

DETAILED DESCRIPTION OF THE PREFERRED EMBODIMENTS

The following description of the preferred embodiments is merely exemplary in nature and is in no way intended to limit the invention, its application, or uses.

The present invention proposes a solution for the Configuration Management of a P2P Network. It introduces a Configuration Management Language (CML) describing models of devices and models of the target function a user wants the CE Network to perform. The present invention is illustrated with respect to an example showing how configuration management configures an existing set of devices to perform an IP Video-conference.

The present invention uses the P2P Presence service to discover the devices in the network and to discover the P2P links between them. Doing so, the invention leverages the P2P presence service into a configuration monitor, and provides all the device and connection data to the Configuration Management mapping the devices to the target functions. It is envisioned that the CML, the P2P Presence service, and the Configuration management mechanism can be implemented in various ways to accomplish varying embodiments of the present invention. However, a preferred embodiment is accomplished by implementing an XML+OWL based CML and a Configuration Management based on CSP.

The problem to solve is, given a set of devices, their connections and their operations; and given a set of target functions for the overall system, find a P2P configuration of a P2P network fulfilling the target functions by using the devices operations and their connections. Examples of devices are: VCR, IP Camera, Still Camera, TV, VideoCam, sensors, and other devices. Examples of target functions are functions an end-user would like to deploy over the P2P Network: IP video conference, home theater, home surveillance, elderly care, and other functions.

Figure 1:
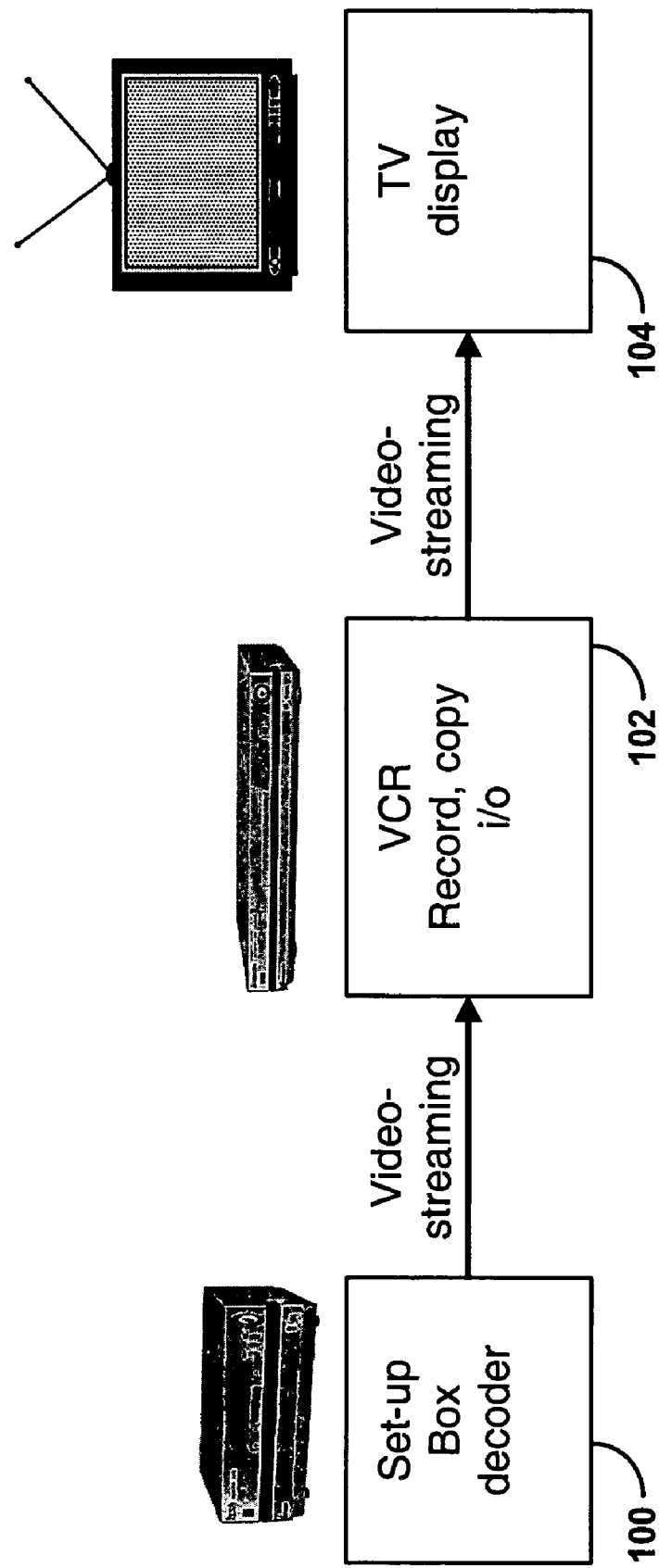
FIG. 1 is a block diagram illustrating a classic configuration example.

As an example problem, given a set-up box, a VCR (with recording and i/o copy operations) and a TV, and given the goal to watch TV while recording, a possible solution configuration is illustrated in FIG. 1. The configuration described in FIG. 1 is the classic configuration used when connecting a set-up box 100, to a VCR 102, and a TV 104. Each of the devices carries out specific operations. The set-up-box decodes the signal from the cable, sends a video-stream to the VCR which copies this stream to its output, as well as records it. Finally the VCR sends a video-stream to the TV, which decodes and displays it.

Currently these configurations are hard-coded in both: the devices (with their specific functions and dedicated connections) and their user-manuals. For future devices, the configurations evolve over time and the CE Networks will be more dynamic, providing access to new devices with possibly new operations and welcoming new target functions for the complete system. Some of the use-cases herein show how a home CE Network is used in different configurations for entertainment, home surveillance, and IP Video-conference. The configuration management for these CE Networks needs to be automated and to provide a very simple user-interface.

Figure 2:
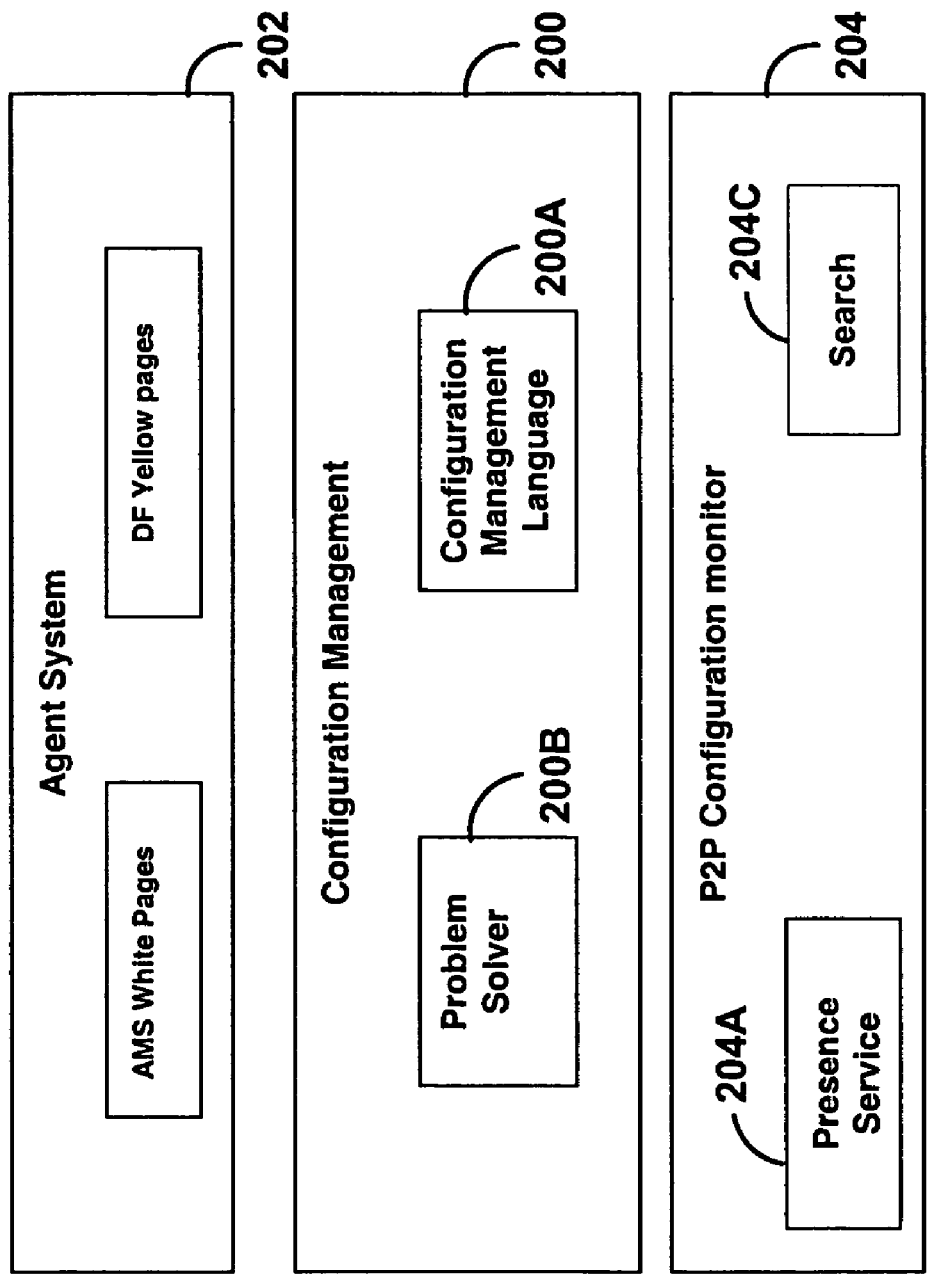
FIG. 2 is a block diagram illustrating a functional architecture of P2P configuration management in accordance with the present invention.

Turning now to FIG. 2, current peer-to-peer (P2P) systems (for example UPnP Forum www.upnp.org, Skype www.skype.com) need an additional level to deploy manage and configure various applications automatically, including new applications. Agent technology is uniquely well-suited for this task, because it is intrinsically P2P, capable of managing configurations, and capable of leading negotiations in serverless environments.

The present invention introduces a configuration management level 200 linking a P2P network to an agent level 202. The P2P configuration monitor 204 has a presence service 204A maintaining and updating the present peers. The present invention leverages this presence service into a configuration monitor of the P2P network since the presence service reports every connection between peers, hence every connection between devices in the P2P CE Network. In part, the present invention introduces at the level of the presence service the communication capabilities and the operation supported by each of the peers.

The configuration management level 200 has two main components: the configuration management language (CML) 200A links the desired target functions to the operations and the communications of each of the devices in the P2P network. The problem solver 200B technique has the mission to map the effective configuration of the P2P network, as reported by the P2P Configuration Monitor 204, to the desired target functions of the network, as defined in the configuration management language 200A. As such, the problem to solve is the mapping of the generic target function to an instance of the existing configuration of the P2P network. It is envisioned that using off-the-shelf components can effectively realize the problem solving. The presently preferred embodiment uses Constraint Satisfaction Problem Solving (CSP), however other techniques based on logic and reasoning, like planning and first-order logic, are also good candidates. Finally, at the highest level, agents may negotiate the configurations according to external constraints, user-preferences and needs, and in case of concurrent target functions competing for resources. The negotiation and decision making at the agent layer will be readily understood by one skilled in the art.

As described in further detail below, the CML describes the devices and the functions of the NetCE Environment. Also, the P2P configuration monitor uses the P2P presence service to monitor the current presence of devices in the CE Network. Further, the configuration management mechanism takes as input a model of a target function or functions and, using the CML, finds a mapping between the function or functions and the present devices in the CE Network, as reported by the configuration monitor.

Figure 3:
FIG. 3 is a block diagram illustrating an atomic language element of a configuration management language (CML) in accordance with the present invention.

Turning now to FIG. 3, the CML is made up of atomic language elements. In particular, the language is defined to represent basic operations and communication capabilities as an atomic language element {communication; operation; communication}.

The operations are defined as a set of functions with their parameters. In a presently preferred embodiment, operations are defined for the NetCE devices as follows:
Image-capture <parameters>;
Video-capture <parameters>;
Audio-capture <parameters>;
MPEG <parameters>;
Codec <parameters>;
Xmit <parameters>;
rendering <parameters>;
display <parameters>; and
storage <parameters>.
Similarly the communications are also defined by a set of functions plus their parameters. In a presently preferred embodiment, the operations are defined for the NetCE devices as follows by the couple {Protocol, Type of Media} with:
Protocol: TCP/IP <parameters>|2G <parameters>|3G <parameters>|Bluetooth <parameters>|NIL|. . . ;
Type of Media: Audio-streaming <parameters>|Video-streaming <parameters>|NIL|. . .

Figure 4:
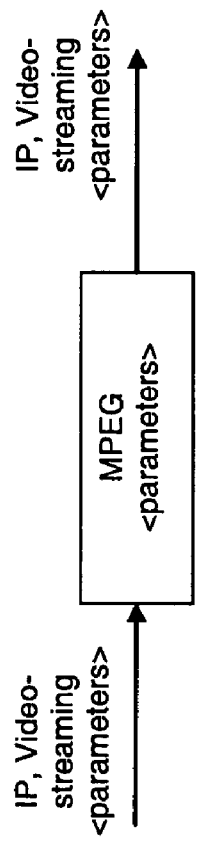
FIG. 4 is a block diagram illustrating an example of an atomic language element of a CML representing an operation of an existing CE device, such as an MPEG decoder, in accordance with the present invention.

Turning now to FIG. 4, an instance of an atomic language element of a CML {communication; operation; communication} can, for example, represent an operation of an existing CE device that is reading the data from a video-streaming input, transcoding data into MPEG, and feeding them to a video-stream. This operation can be represented by
{IP, video-streaming; MPEG-transcription; IP, video-streaming} in CML.

Figure 5:
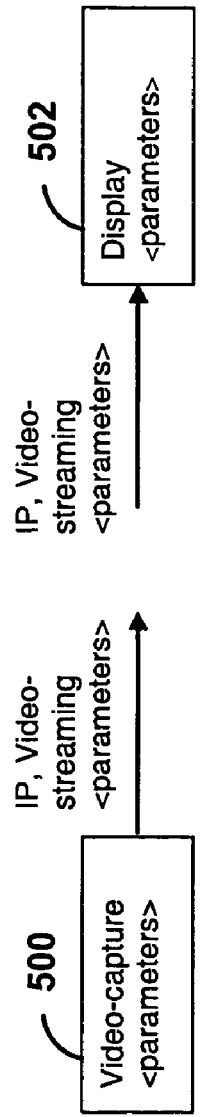
FIG. 5 is a block diagram illustrating special cases of atomic language elements of a CML that have either no input parameters or no output parameters in accordance with the present invention.

Turning now to FIG. 5, some operations do not need both an input and an output. For example, a video-capture operation generates a video-output stream, but does not need an input stream. It can be modeled in CML by:
{null; video-capture; IP, video-streaming}.

Conversely, a TV screen takes a video-stream as an input and shows the image on the screen, but does not provide a connection for another appliance. This operation can be represented in CML by
{IP, video-streaming; Display; null}.

Figure 6:
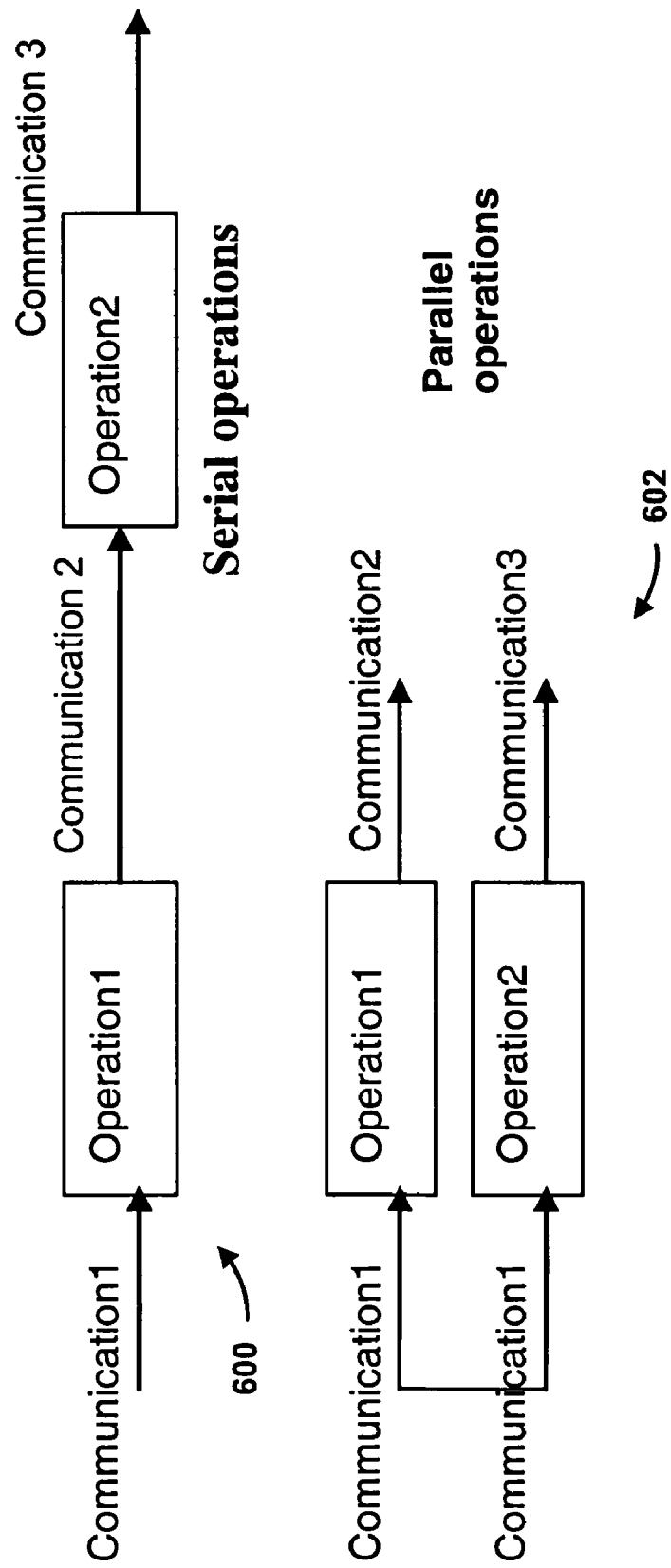
FIG. 6 is a block diagram illustrating composition rules for atomic language elements of a CML, including sequential and parallel operation execution, in accordance with the present invention.

Turning now to FIG. 6, there are two simple composition rules regarding atomic CML elements: sequential and parallel execution. Sequential execution at 600 can be specified by {{communication1; operations1; communication2}{communication2; operation2; communication3} . . . }Parallel execution at 602 can be specified by {// {communication1; operation1; communication2}{communication1; operation2; communications} . . . }

Figure 7:
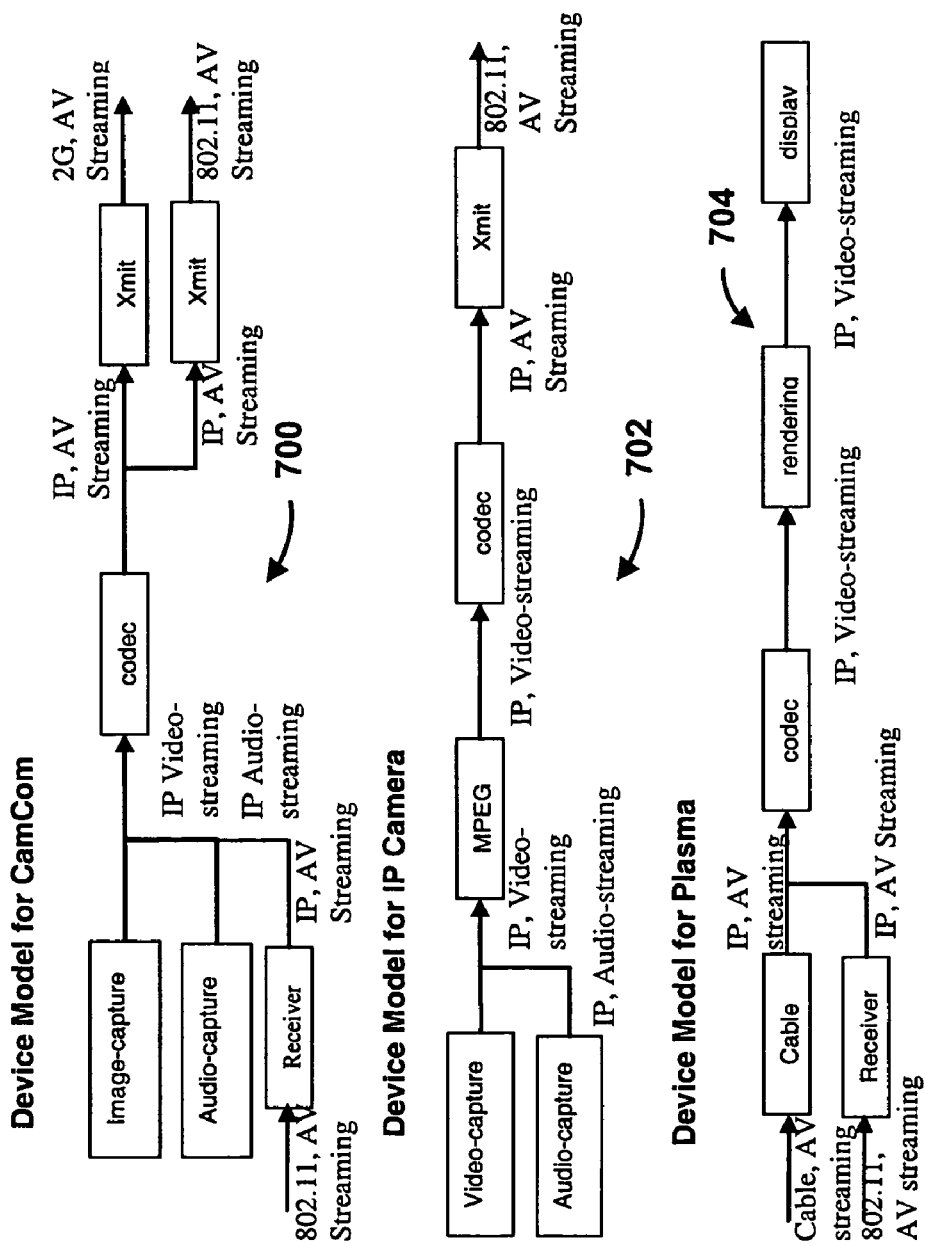
FIG. 7 is a block diagram illustrating composition of sets of atomic language elements to form complete device models in accordance with the present invention.

Turning now to FIG. 7, the atomic language elements can be used to describe CE devices as well as networks of CE devices. These descriptions can be accomplished by composition of the atomic language elements into larger sets of operations representing devices. For example, by using the language defined above, it is possible to describe a CamCom, an IP camera, and a Plasma screen.

In a presently preferred embodiment, the Model for the CamCom can be described as follows:

```
{CamCom
  {// { ; image-capture ; IP, video-streaming}
    { ; audio-capture ; IP, audio-streaming}
    {802.11, AVStreaming ; Receiver ; IP, AVStreaming}}
  {IP, AVStreaming ; codec ; IP, AVStreaming}
  {// {IP, AVStreaming ; Xmit ; 2G, AVStreaming }
    { IP, AVStreaming ; Xmit ; 802.11, AVStreaming }}}
```

Figure 8:
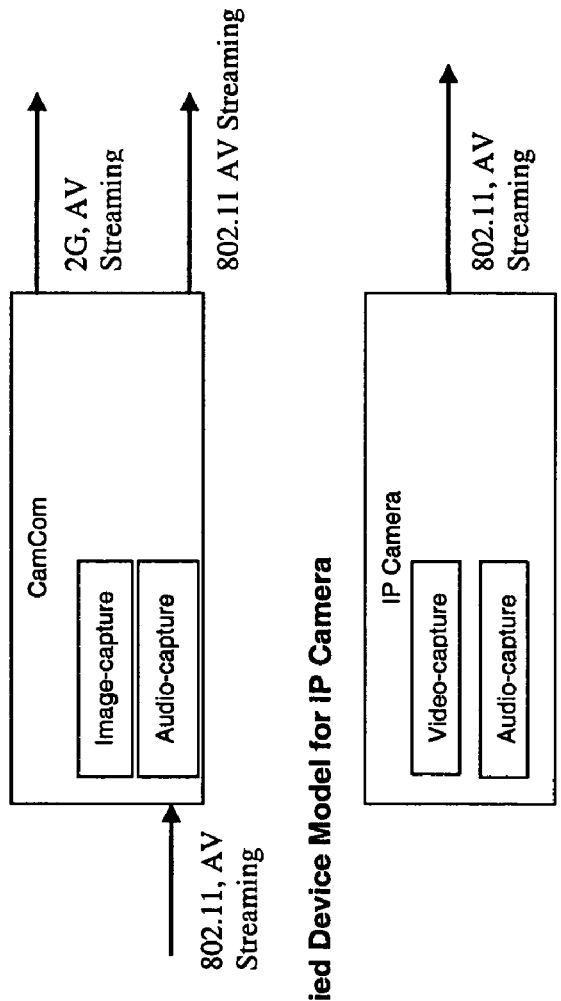
FIG. 8 is a block diagram illustrating simplified device models emphasizing external connections and major functions of the devices, and deemphasizing composition of the individual atomic language elements of the device models in accordance with the present invention.

Notably, in the device models by CML, the device I/O and its interfaces to the external world are provided so that it becomes possible to connect these devices together. As this device connection model is a useful representation for configuration management,- convenience is provided by introducing a simplified device model showing only the external connections and major functions. FIG. 8 shows the simplified device models corresponding to the models presented in FIG. 7. The simplified models contain only the I/O and the sensors of the devices. The extraction of the simplified models from the device models can be performed automatically by detection of I/O entering and leaving the device models in CML.

In a presently preferred embodiment, the simplified Model for the CamCom can be described as follows:

```
{CamCom
  {{// { ;image-capture; }
    { ;audio-capture; }
    {802:11, AVStreaming; ;}}
  {// { ; ; 2G, AVStreaming }
    { ; ; 802.11, AVStreaming }}}
```

Turning now to FIG. 9, the atomic language elements can be used to describe target functions. For example, by using the language defined above, one can describe the configuration of an IP Video-conference. The example configuration only represents the stream of information flowing from "input function" to a "rendering function". It should be readily understood that IP Video-conference also provides the symmetric connection to provide a two-way exchange.

Referring now to FIG. 10, in the same manner as for the device simplified models, a function simplified model shows the I/O of each of the functions. This simplified model can be important for the configuration management operations when functions should be linked together to form composite functions. The same algorithms as the ones used to extract the simplified device model can be used to extract the simplified function model.

In a presently preferred embodiment, a simplified Model for the IP Video-conference can be described as follows:

```
For input functions:
{'IP Video-conference'
  {// { ;video-capture; }
    { ;audio-capture; }}
  { ; ; 2G, AVStreaming }}
For rendering functions:
{'IP Video-conference'
  { 2G, AVStreaming ; ;}
  {// { ;display ; }
    { ;audio; }}}
```

The presence service of the P2P configuration monitor system maintains and updates the list of the present devices and their connections. To do this, the P2P presence service uses models (complete and/or simplified) of the IP Video-conference function as described in FIG. 7 and FIG. 8. In addition to the device models, parameters describe the qualities and properties of the device, their connections and their constraints. Examples of such properties are: screen size and color capabilities; AV scaling factor; static versus mobile device; always on; connection constraints; and bandwidth. In a preferred embodiment, the example of the CamCom representation in the P2P configuration monitor can be represented by Table 1.

TABLE 1

| Device description in P2P presence service | |
| --- | --- |
| Device | Presence in the network (yes/no) |
| name | CamCom |
| input | 802.11, AVStreaming |
| output | 802.11, AVStreaming; 2G, AVStreaming |
| Device model | Complete and/or simplified model |
| Static/mobile | static/mobile |
| Always on | yes/no |
| . . . | |

In some embodiments, the present invention leverages an existing P2P presence service into a configuration monitor tracking in real-time all the present devices on the P2P network and their connections. Additionally, the P2P presence service can answer two questions: whether device A is present in the network; and whether device A can connect with device B. Returning to FIG. 2, some embodiments of the present invention add search capabilities into the existing search mechanism 204C of the P2P networks. Some examples of the added search functions work on the content of Table 1 as follows: find devices with input X; find devices with output Y; find devices containing operations Z; find unused operations; find unused communications.

Accordingly, some embodiments of the present invention can encompass a search function for each of the lines of Table 1. These additional search capabilities can specialize the P2P presence service to become an efficient configuration monitor, capable of finding present devices and links between devices (as P2P normally does), but also capable of finding operations and connection capabilities within the device network.

Figure 11:
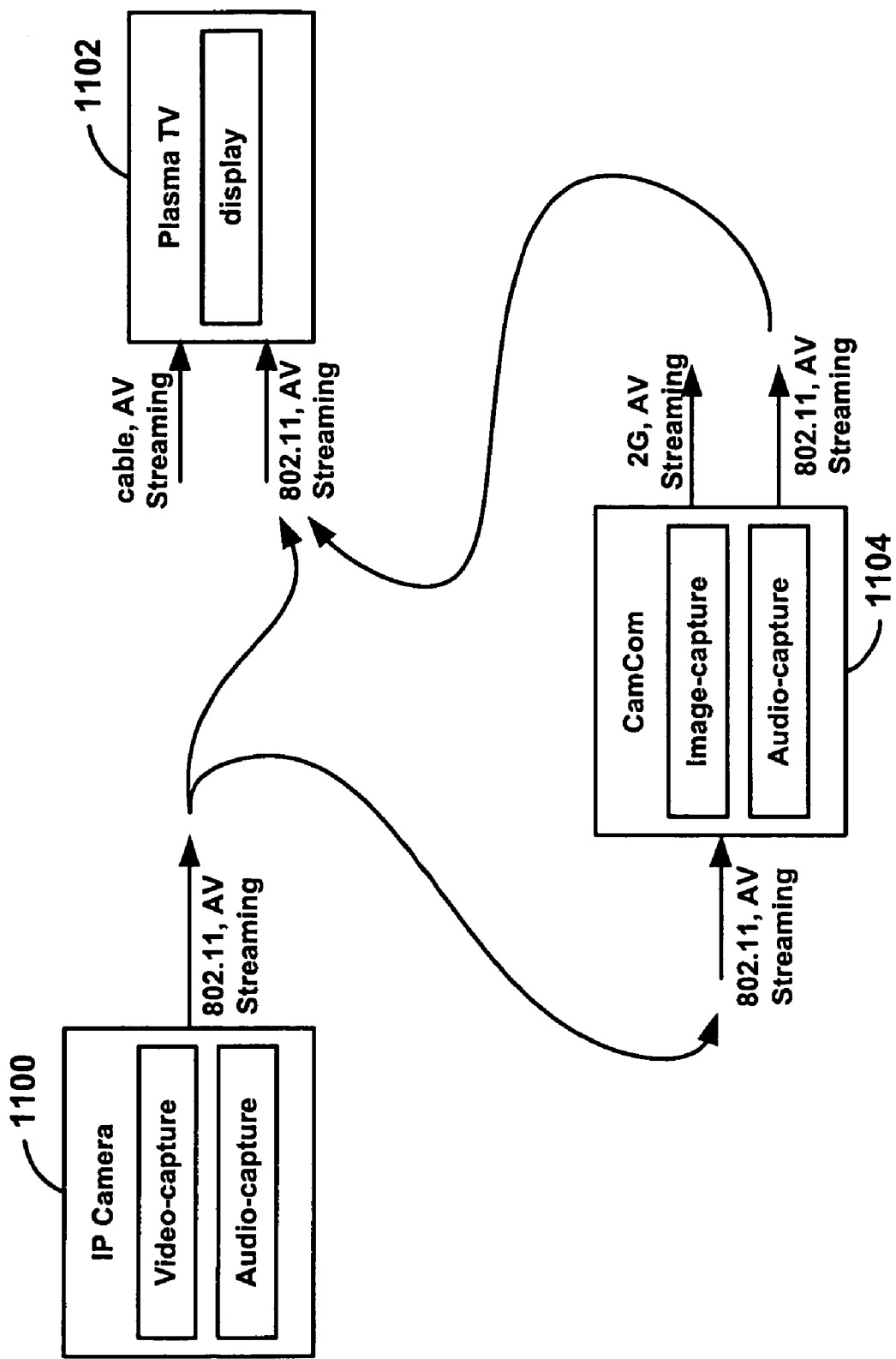
FIG. 11 is a block diagram illustrating an example of a configuration of a P2P device network as provided by a P2P configuration monitor in accordance with the present invention.

Turning now to FIG. 11, a configuration of a P2P device network can be provided by the P2P Configuration Monitor. Three devices are present: IP camera 1100, Plasma TV 1102, and CamCom 1104. The IP Camera can be connected to both the Plasma TV and the CamCom. In turn, the CamCom can also connect to the Plasma TV. Thus, the P2P Configuration Monitor plays a role in solving the configuration management problem by providing an "image" of the current configuration of the system.

The function of the configuration manager is to find a mapping between the abstract target function given as an input by the end-user (see FIG. 10), and the configuration of the current instance of the P2P network, as given by the P2P presence service described in FIG. 11. The problem representation introduced herein opens the possibility to use a set of techniques to fulfill this configuration function by mapping the sub-graphs while respecting their constraints. A presently preferred embodiment uses Constraint Satisfaction Problem Solving, however other solutions are possible with planning techniques, reasoning, dynamic programming, etc. The configuration manager can work independently with simplified or complete models.

Figure 12:
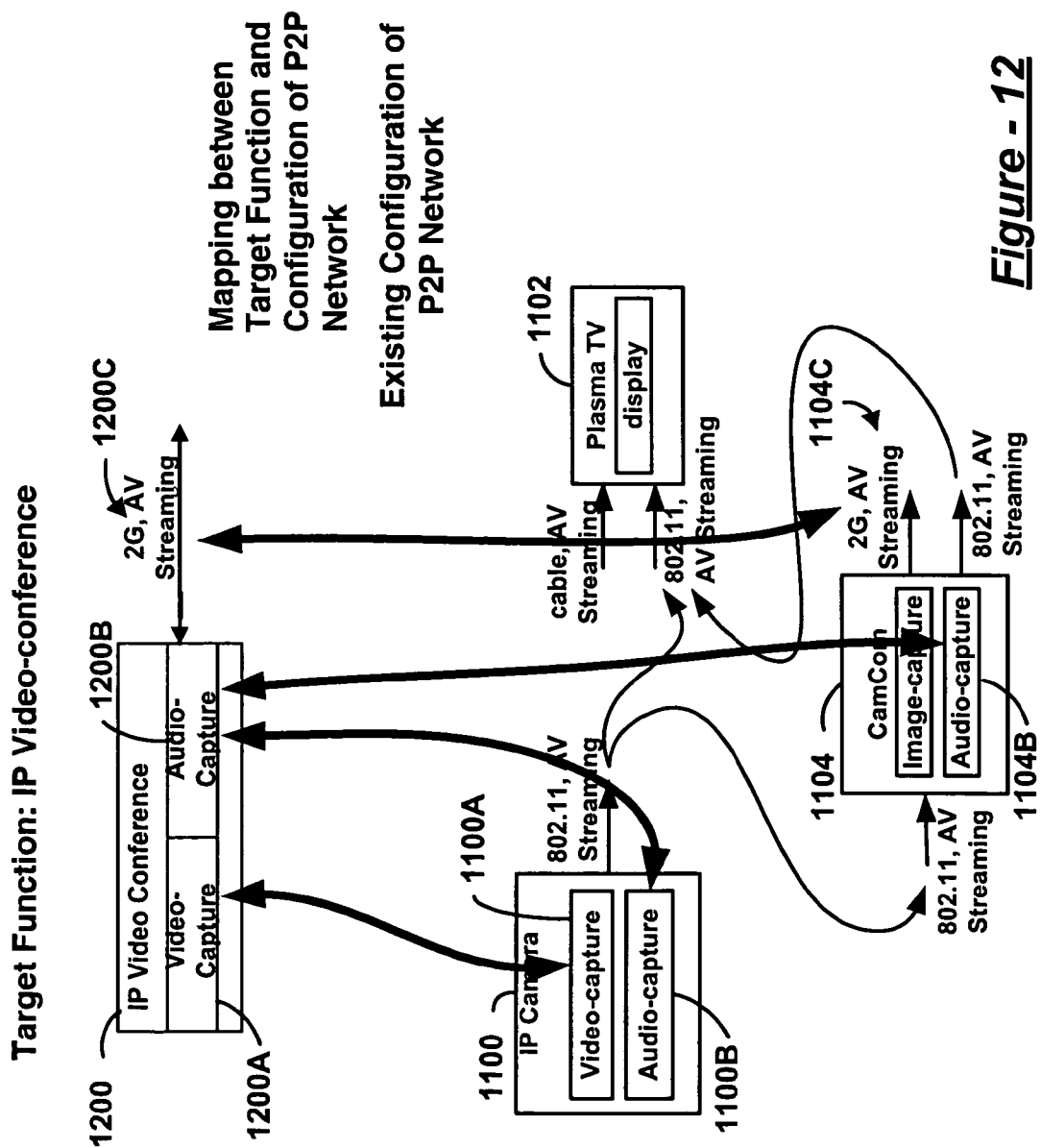
FIG. 12 is a block diagram illustrating mapping of simplified models to accomplish mapping between a target function and a configuration of a P2P network in accordance with the present invention.

Turning now to FIG. 12, the complexity of the mapping process can be reduced by employing a first phase that involves using the simplified models to scope the solutions and reduce the possible combinatorial explosion of the solution space. The mapping makes a link between the abstract operations model of the IP Video-conference target function 1200. For example, video and audio functions 1200A and 1200B are mapped to the video and audio functions 1100A and 1100B of the IP camera 1100. In addition, the target audio function 1200B can also be mapped to the audio function 1104B of the CamCom 1104. Regarding the communications, the 2G AVStreaming outgoing communication 1200C of the target IP Video-conference function 1200 can be linked to the outgoing 2G AVStreaming communication 1104C of the CamCom 1104. This first phase provides an initial mapping between the simplified models. The advantage of using these simplified models, is to remove unnecessary computations. In the particular example in FIG. 12, the Plasma TV can be removed from the mapping as it does not play a role in the solution in the solution of the IP Video-conference "input function".

Figure 13:
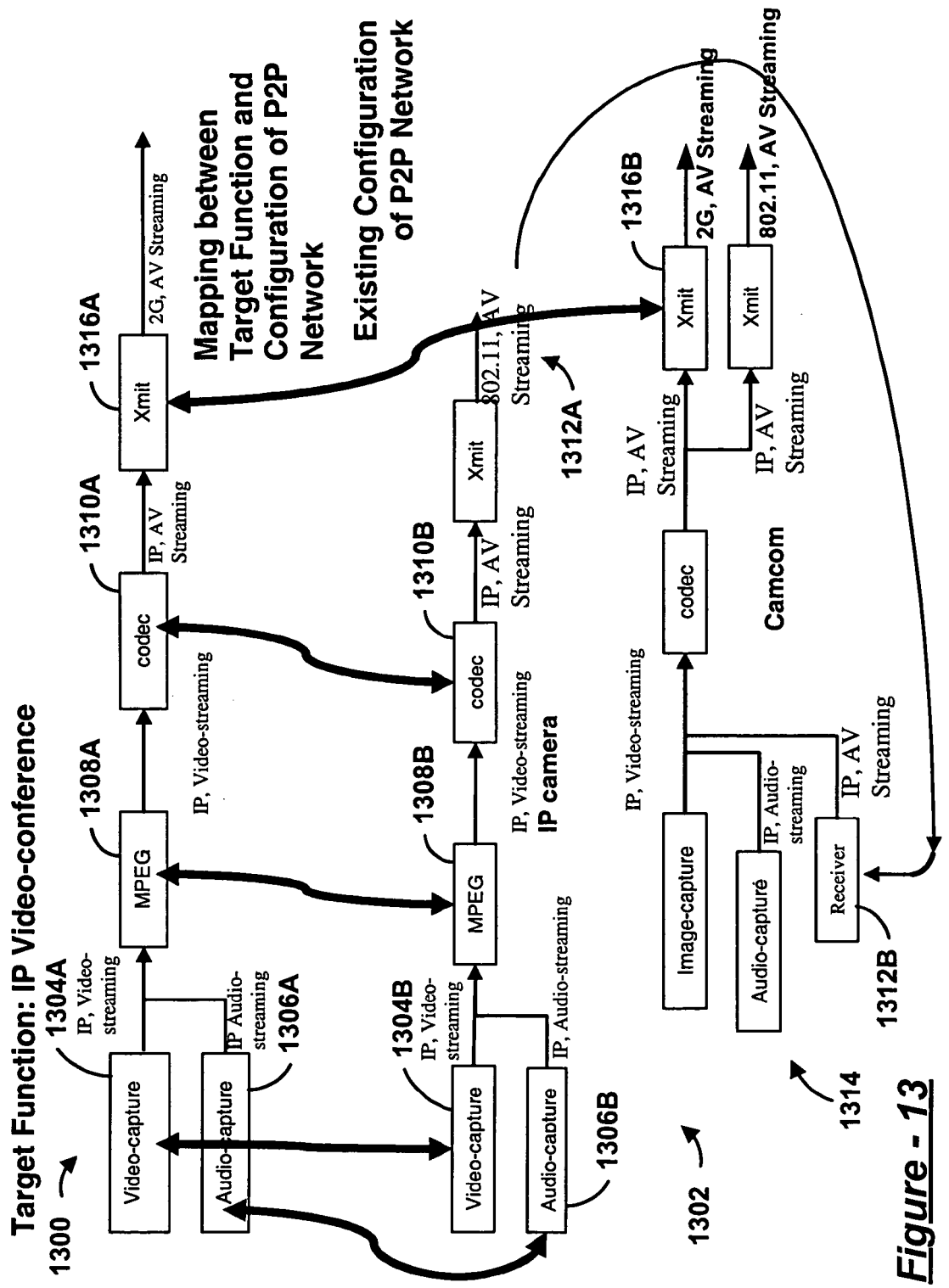
FIG. 13 is a block diagram illustrating mapping of complete models to accomplish mapping between a target function and a configuration of a P2P network in accordance with the present invention.

Turning now to FIG. 13, a more detailed mapping can be created by using the same algorithms over the complete models of target functions and devices. This mapping finds all the necessary operations in the devices to fulfill the target function 1300, such as IP Video-conference. Most of these operations are present and connected in the IP camera 1302, which can fulfill the function for video 1304A with 1304B, audio 1306A with 1306B, MPEG 1308A with 1308B, and codec 1310A with 1310B. The P2P presence service can detect a possible connection between the IP camera output 1312A and the input 1312B of the CamCom 1314 by using 802.11 AVStreaming. The configuration manager verifies that this connection is capable of transporting the signal from the IP camera to the CamCom and, that the CamCom can transform this signal into an Xmit, producing 2G AVStreaming as an output. Accordingly, xmit function 1316A of the target device can be mapped to xmit function 1316B of the CamCom.

Figure 14:
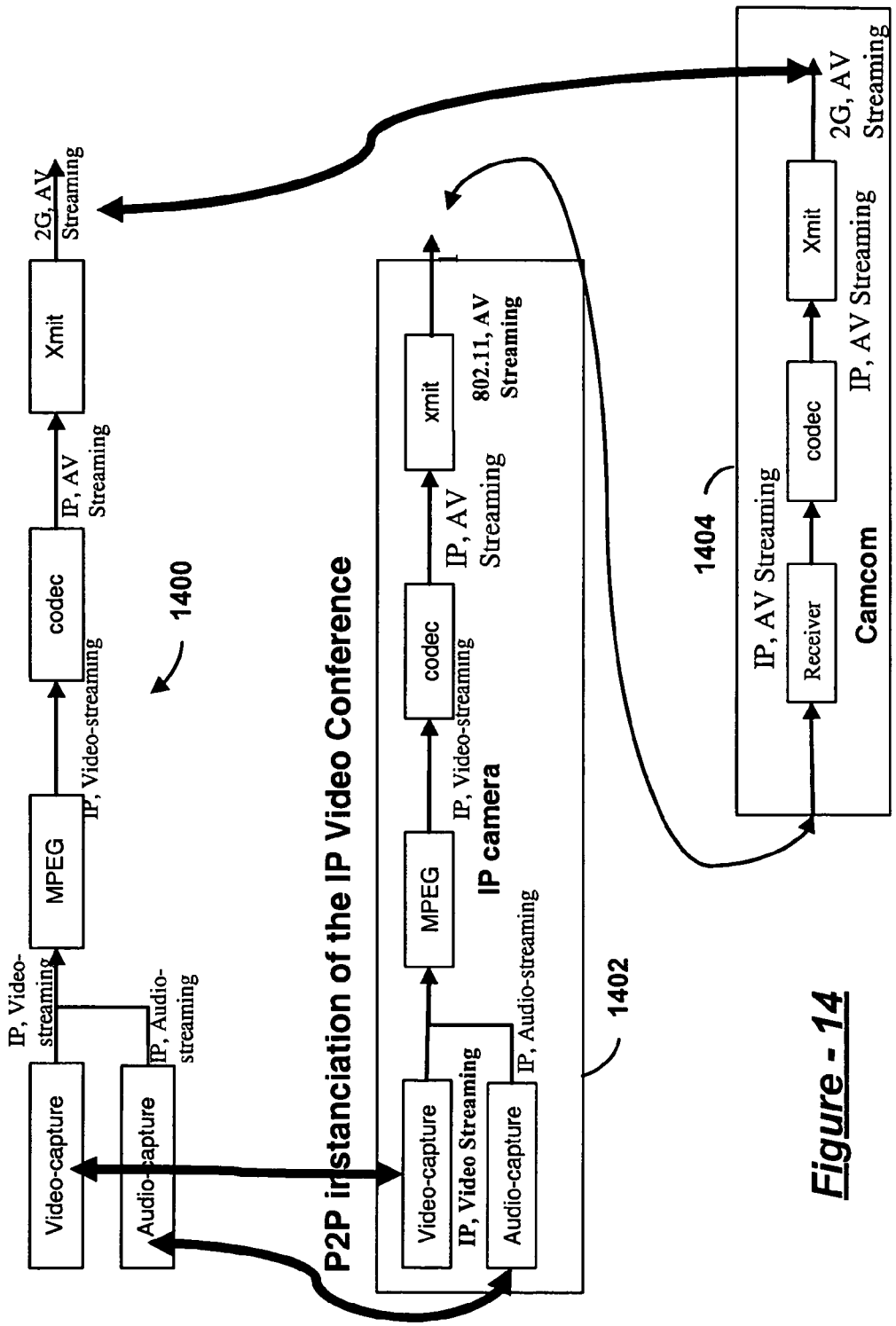
FIG. 14 is a block diagram illustrating a description of "virtual device" obtained by mapping between one or more target functions and a configuration of a P2P network in accordance with the present invention.

Turning now to FIG. 14, the configuration manager finally provides the description of a "virtual device" delivering the IP Video-conference 1400 by using operations and communications from both the IP camera 1402 and the CamCom 1404.

In a presently preferred embodiment, the BNF of the CML is as follows:

```
Device := {name bloc_operations*}
Function := {name bloc_operations*}
Bloc_operations := {// atomic_element+} |{atomic_element+}
Where
{// atomic_element+} means all atomic_elements are carried out in parallel
{atomic_element+} means all atomic_elements are carried out sequentially
Atomic_element:= {communication ; operation ; communication}
Operation:=
Image-capture <parameters> |
Video-capture <parameters> |
Audio-capture <parameters> |
MPEG <parameters> |
Codec <parameters> |
Xmit <parameters> |
Receiver <parameters> |
rendering <parameters> |
display <parameters> |
Storage <parameters>
NIL
...
Communication:= {Protocol, Type of media}
Protocol :
TCP/IP <parameters> |
2G <parameters> |
3G <parameters> |
Bluetooth <parameters> |
...
Type of Media
Audio-streaming <parameters> |
Video-streaming <parameters> |
...
NIL
...
Name:= String of characters.
```

The presently preferred embodiment of the CML uses XML for the description of the CML presented above. Since XML is a widely used technology and is interpreted by many tools and browsers, it allows the quick and easy construction of a development environment for CML. In addition, OWL (Ontology Web Language) is preferably used to express parameters, relations, and constraints of the CML elements. The use of OWL is very well suited to describe these relations and languages and to the resolution of configuration management.

The presently preferred embodiment for the configuration manager is a CSP (Constraint Satisfaction Problem Solver). This technique is extremely efficient for solving configuration management, and to find solutions of problems in highly constrained environments. The more there are constraints in the problem, the more this technique is efficient. As it is envisioned that the CE network environment is heavily constrained, this technique should perform well.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A configuration management system for use in a peer-to-peer (P2P) Network comprising:
the P2P network supporting a plurality of different communication protocols;

a plurality of consumer electronics (CE) devices in the P2P network, each CE device having at least one available operation and each CE device supporting at least one of the plurality of different communication protocols for receiving input and/or sending output;

a P2P presence module that identifies the presence of CE devices in the P2P network and that identifies the communication protocols supported by the CE devices present in the P2P network;

a P2P search module that identifies the available operations of each CE device in the P2P network;

a CE device data structure corresponding to each CE device in the P2P network, each CE device data structure including
 a) a type of CE device;
 b) the presence of the CE device in the P2P network;
 c) the at least one available operation of the CE device; and
 d) the at least one communication protocol supported by the CE device;

a plurality of supported function data structures, each supported function data structure including:
 a) a supported function type; and
 b) a list of operations used to perform the supported function;

a configuration management module that receives a target function and determines a set of operations to perform the target function based on the supported function data structures; and the configuration management module generating a mapping of CE devices for performing the target function based on the set of operations to perform the target function and the plurality of CE device data structures, wherein the mapping links a group of CE devices to perform the target function based on the at least one communication protocol of each CE device in the group of CE devices to perform the target function.

2. The configuration management system of claim 1 further comprising a configuration management language that defines a CE device by a type of device, at least one available operation of the CE device, and at least one communication protocol supported by the CE device, wherein the configuration management language is used to populate the plurality of CE device data structures.

3. The system of claim 2, wherein said configuration management language is composed of atomic language elements defined to represent basic operations and communication capabilities, wherein communication capabilities correspond to a communication protocol supported by a CE device to receive input and communication protocol supported by a CE device to transmit output.

4. The system of claim 3, wherein at least one atomic language element is predefined to represent an operation of an existing CE device.

5. The system of claim 3, wherein at least one atomic language element is predefined to have no input parameters.

6. The system of claim 3, wherein at least one atomic language element is predefined to have no output parameters.

7. The system of claim 3, wherein composition rules for atomic language elements including sequential and parallel operation execution.

8. The system of claim 7, wherein at least one complete device model for a CE device is predefined as a set of composed atomic language elements.

9. The system of claim 8, wherein at least one simplified device model is predefined for the CE device to emphasize external connections and major functions of the device.

10. The system of claim 9, wherein the at least one simplified device model of the target function is composed of atomic language elements.

11. The system of claim 10, wherein the at least one simplified device model of the target function includes a function complete model of the target function that specifies composition of the atomic language elements according to composition rules for atomic language elements including sequential and parallel operation execution.

12. The system of claim 11, wherein the at least one simplified device model of the target function or functions includes a function simplified model that emphasizes external connections and primary sub-functions of the target function.

13. The system of claim 12, wherein said configuration management mechanism accomplishes mapping between the function and the present devices in the P2P Network by initially mapping one or more function simplified models representing the target function to simplified models representing the present devices in the P2P network.

14. The system of claim 13, wherein said configuration management mechanism accomplishes mapping between the function and the present devices in the P2P Network by subsequently mapping one or more function complete models representing the target function or functions to complete models representing the present devices in the P2P network.

15. The configuration management system of claim 1 wherein a Constraint Satisfaction Problem Solver is used to generate the mappings, wherein the Constraint Satisfaction Problem Solver takes the available operations of the CE devices in the P2P network and the communication protocols supported by each CE device in the P2P network as constraints.

16. A configuration management method for use with a peer-to-peer (P2P) consumer electronics (CE) network, comprising:

maintaining the P2P CE network, wherein the P2P CE network includes a plurality of devices of varying type and wherein the P2P CE network supports a plurality of different communication protocols used by the plurality of devices;

employing a configuration management language to describe devices in the P2P CE network, wherein each device is described by a device types, a presence of the CE device in the P2P network, available operations that are performed by the device, and communication protocols supported by the device;

using a P2P presence service to monitor current presence of devices in the P2P CE Network and to monitor the communication protocols of the devices in the P2P CE network;

identifying the available operations of each device in the P2P CE network;

maintaining a list of supported functions, wherein a supported function is defined by a type of function and a list of operations used to perform the supported function;

taking as input a model of at least one target function;

determining a set of operations to perform the target function based on the list of supported functions; and using said configuration management language, finding a mapping between the present devices in the P2P CE Network, wherein the mapping is based on the model of the at least one target function, the available operations that are performed by the devices present in the P2P CE network, and the communication protocols of the present devices, wherein the mapping links a group of devices to perform the target function based on the at least one communication protocol of each device in the group of devices to perform the target function.

17. The method of claim 16, further comprising using the P2P presence service to find operations and connection capabilities of devices within the P2P CE network, wherein communication capabilities correspond to a communication protocol supported by a device within the P2P CE network to receive input and communication protocol supported by the device within the P2P CE network to transmit output.

18. The method of claim 17, further comprising using the P2P presence service to at least one of: find devices having a particular type of input capability; find devices having a particular type of output capability; find devices containing a particular type of operation; find unused operations; or find unused communications.

19. The method of claim 16, further comprising employing a configuration management language composed of atomic language elements defined to represent basic operations and communication capabilities.

20. The method of claim 19, further comprising employing a configuration management language having composition rules for atomic language elements including sequential and parallel operation execution.

21. The method of claim 20, wherein taking as input a model of at least one target function includes:

receiving a function complete model of the target function that specifies composition of atomic language elements; and receiving a function simplified model that emphasizes external connections and primary sub-functions of the target function.

22. The method of claim 21, further comprising finding the mapping between the at least one function and the present devices in the P2P CE Network by initially mapping one or more function simplified models representing the at least one target function to simplified models representing the present devices in the P2P CE network, wherein the simplified models representing the present devices are predefined for the devices to emphasize external connections and major functions of the devices.

23. The method of claim 22, further comprising finding the mapping between the function and the present devices in the P2P CE network by subsequently mapping one or more function complete models representing at least one target function to complete models representing the present devices in the P2P CE network, wherein the complete models representing the present devices are predefined as one or more sets of composed atomic language elements.

* * * * *